Patented Aug. 2, 1932

1,870,071

UNITED STATES PATENT OFFICE

WALTER SCHOELLER, ERWIN SCHWENK, AND HANS JORDAN, OF BERLIN, GERMANY, ASSIGNORS TO SCHERING-KAHLBAUM A.-G., OF BERLIN, GERMANY

PRODUCTION OF PIPERIDINE

No Drawing. Application filed June 7, 1930, Serial No. 459,826, and in Germany June 21, 1929.

This application refers to an improvement in the production of piperidine.

As it is well known pyridine by treating with hydrogen in the presence of hydrogenation catalysts can be transformed into piperidine. However this reaction can be carried through only with difficulty, as there is always a great deal of ammonia and tertiary bases produced.

We have found, that these drawbacks can be avoided if the hydrogenation of the pyridine is carried through in a short time and at low temperatures by means of a high hydrogen pressure and highly efficient hydrogenation catalyst. A pressure of 100-150 atm. is sufficient to perform the reaction at a temperature below 160° in a few hours. Owing to the fact that the reaction is exothermic, after the beginning of the reaction no further heat supply is needed. The reaction can be moderated by cooling or stopping of the hydrogen current.

As hydrogenation catalyst can be used nickel-catalysts or mixed-catalysts with nickel as basis, which are precipitated on carriers such as silica gel or kieselguhr etc.

Highly active nickel catalysts can be produced by precipitating nickel hydroxide or nickel carbonate upon carriers and reducing the nickel compound at high temperatures in a stream of hydrogen.

It has been proved advantageous to admix to the reacting mixture substances like cyclohexane, tetrahydronaphthaline or menthol which by splitting off hydrogen, are able to form substances of a lower degree of hydrogenation.

Example 80 g. pyridine and 4 g. of a nickel catalyst which is precipitated on silica gel are treated in an autoclave with hydrogen of 100-150 atm. at a temperature not above 160° C. After 1½-2 hours no further hydrogen is taken up. The liquid is separated from the catalyst and fractionated. There are obtained 78 g. piperidine of the boiling point 104° C. and 5 g. second runnings of the boiling point 104-112° C. The rest contains bases of a higher boiling point.

The process can also be carried through by adding 8 g. tetrahydronaphthaline to the reacting mixture in the autoclave.

Various changes may be made in the details disclosed in the foregoing specification without departing from the invention or sacrificing the advantages thereof.

We claim:—

1. The process of the manufacture of piperidine comprising treating pyridine in the presence of a highly active nickel catalyst with hydrogen of 100-150 atm. at a temperature not above 160° C.

2. The process of the manufacture of piperidine comprising treating pyridine with hydrogen of 100-150 atm. at a temperature not above 160° C. in the presence of a highly active nickel catalyst and a hydroaromatic compound.

3. The process of the manufacture of piperidine comprising treating pyridine with hydrogen of 100-150 atm. at a temperature not above 160° C. in the presence of a highly active nickel catalyst and of tetrahydronaphthaline.

WALTER SCHOELLER.
ERWIN SCHWENK.
HANS JORDAN.